Nov. 6, 1951  W. D. KARL  2,573,714
SIDE DUMP FOR GRAIN WAGONS

Filed July 24, 1947  2 SHEETS—SHEET 1

INVENTOR.
William D. Karl,
BY Victor J. Evans & Co.
ATTORNEYS

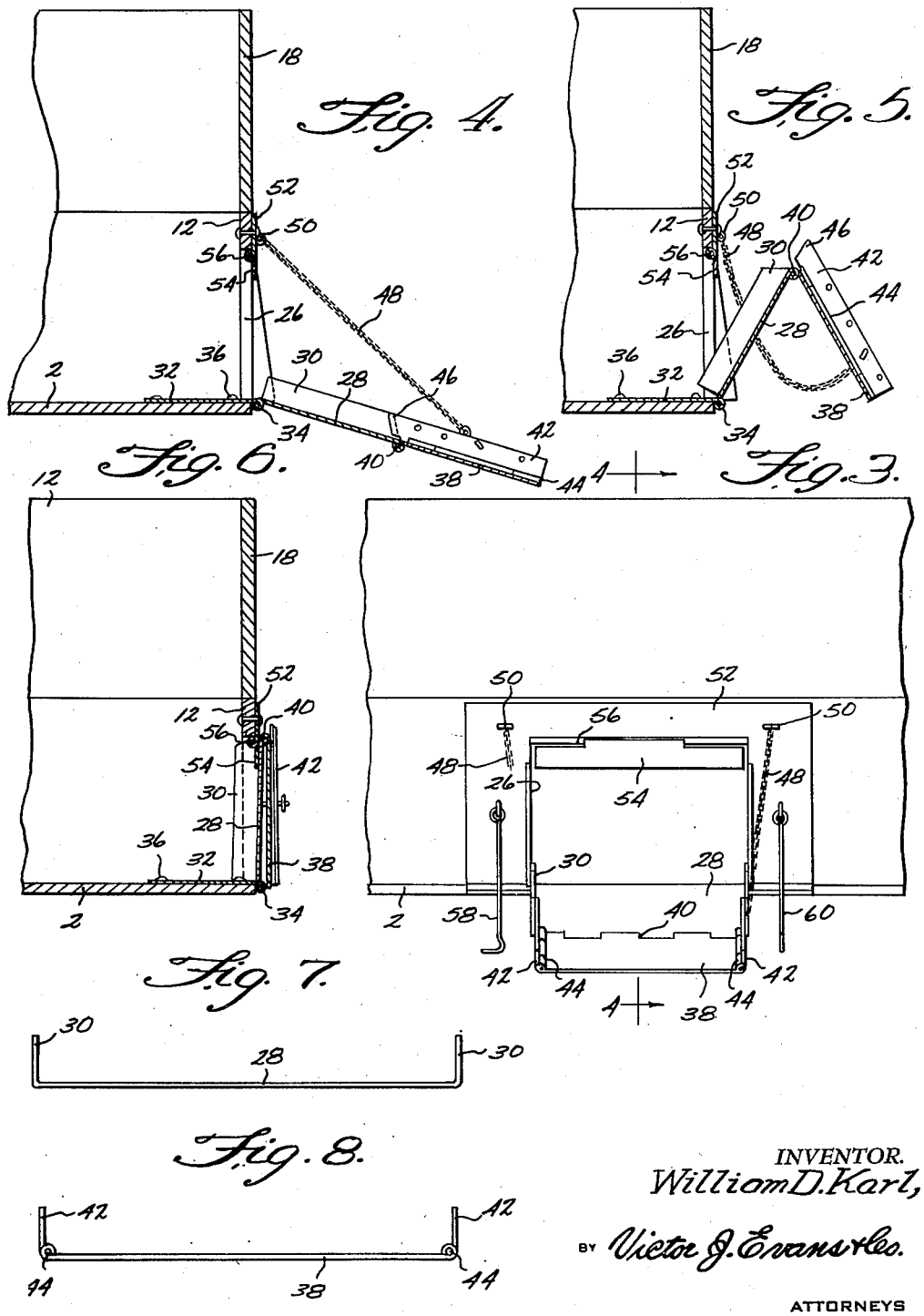

Patented Nov. 6, 1951

2,573,714

UNITED STATES PATENT OFFICE 2,573,714

SIDE DUMP FOR GRAIN WAGONS

William D. Karl, Easton, Mo.; John W. Karl administrator of said William D. Karl, deceased Application July 24, 1947, Serial No. 763,412

2 Claims. (Cl. 298—7)

My present invention relates to an improved side dump for grain wagons of the type designed for use with conventional farm wagons employed in hauling corn and the dump of my invention is so formed as to be adaptable for use in existing wagons as auxiliary equipment or as regular equipment in new wagons.

Generally the device consists in a folded door for an opening in the side of the wagon which may be unfolded into a chute so that the corn will discharge by gravity into the bin or elevator.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 3 is an elevational view of the wagon showing the dump open.

Figs. 4, 5 and 6 are sectional views at line 4—4 of Fig. 3 with the dump device in various positions.

Fig. 7 is an end elevational view of the inner folding section, and

Fig. 8 is an end elevational view of the outer folding section.

Figure 1:
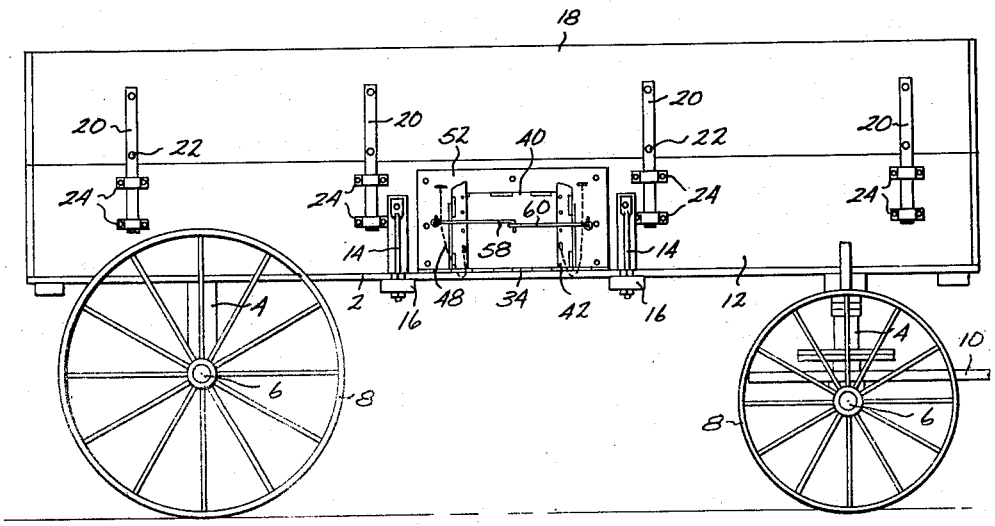
Fig. 1 is a side elevational view of the wagon of my invention.

Referring now to the drawings I have illustrated the present preferred form of my invention as used with a conventional farm wagon having a floor 2 and axle supports 4 for the axles 6 on which are journaled wheels 8, the front axle assembly having draw bar or tongue 10.

Side boards 12 are secured to the wagon floor by brackets 14 on ribs 16, and the upper boards 18 have stakes 20 secured at 22 and resting in brackets 24.

Discharge opening 26 is fashioned in the board 12 and the device for closing and forming a discharge chute therefor comprises my invention.

I provide a sectional chute having an inner section 28 with side flange walls 30 and an extension 32 hinged at 34 and secured to the floor at 36. A foldable or outer section 38 is hinged to the inner section at 40 and this outer section is formed with side flange walls 42 hinged at 44, and the flange walls have interengaging means embodying extensions 46 which overlie the inner section when extended to prevent the downward folding of the chute.

Figure 2:
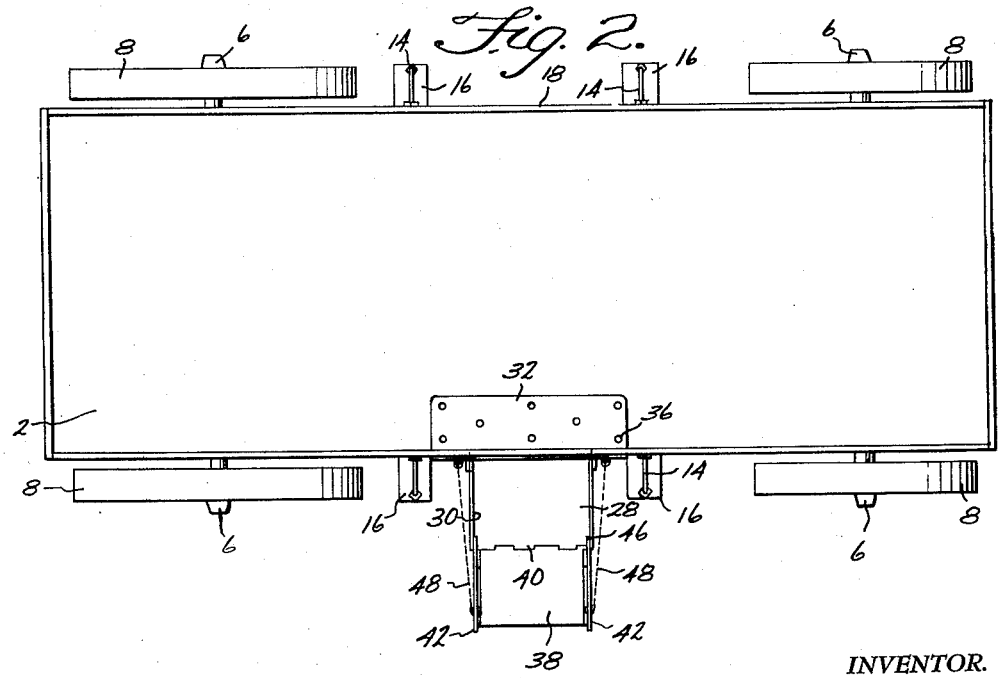
Fig. 2 is a top plan view thereof.

Chains 48 secured at 50 to the frame 52 and to the outer section flange walls 42 support the chute in proper inclined position. The flange walls 42 are hinged at 44 to the section 38, so that the flange walls may swing or pivot about the hinges 44. Thus, the flange walls 42 may either fold inwardly or outwardly when the chute is folded or collapsed. When the chute is in extended position, as shown in Figures 2 and 4, the chains 48 will hold the flange walls 42 as well as the other parts in their proper positions.

An upper flange 54 is hinged at 56 to the frame 52 and serves to effect a closing of the chute when folded, and to control the passage of discharged items when the chute is unfolded. The flange 54 helps prevent small grain from accidentally escaping when the chute is not being used, as when it is in its collapsed position, and the flange 54 also helps guide the grain or other material as it is being discharge from the wagon, the flange 54 being of any desired length.

When carrying corn, for instance, the chute is folded and confines the corn within the wagon, the chute being retained folded by the hook and eye rods 58 and 20. When the discharge point has been reached, the rods are unhooked and the chute unfolded to the position permitted by the chain and the corn, or other commodity will flow by gravity through the aperture and over the chute to the storage bin or elevator. Only the remainder resting on the floor will require manual removal.

Having thus fully described my invention what I claim as new and desire to secure by Letters Patent is:

1. In a side dump, the combination with a wagon, and a side board provided with an opening for the egress therethrough of the contents of the wagon, of a discharge chute operatively connected to said wagon, said discharge chute comprising an inner section hingedly secured to the bottom of said wagon and mounted for movement into and out of closing relation with respect to said opening, a pair of side walls arranged in spaced parallel relation with respect to each other and secured to said inner section, an outer section, a pair of spaced flange walls hingedly secured to said outer section, a frame secured to said side board adjacent the top of said opening, a chain operatively connected to each of said flange walls and to said frame for limiting opening movement of said chute, interengaging means on said flange walls for preventing downward folding of said sections relative to each other, and a flange hingedly secured to said frame for sealing said opening when said chute is closed.

2. In a side dump, the combination with a wagon, and a side board provided with an opening for the egress therethrough of the contents of the wagon, of a discharge chute operatively connected to said wagon, said discharge chute comprising an inner section hingedly secured to the bottom of said wagon and mounted for movement into and out of closing relation with respect to said opening, a pair of sidewalls secured to said inner section, an outer section, a pair of spaced flange walls hingedly connected to said outer section, a frame secured to said side board adjacent said opening, a chain operatively connected to each of said flange walls and to said frame for limiting opening movement of said chute, interengaging means on said flange walls for preventing downward folding of said sections relative to each other, and a flange hingedly secured to said frame for sealing said opening when said chute is closed.

WILLIAM D. KARL.

REFERENCES CITED

The following references are of record in the file of this patent:

UNITED STATES PATENTS

| Number | Name | Date |
| --- | --- | --- |
| 112,968 | Sener | Mar. 21, 1871 |
| 159,211 | Patton et al. | Jan. 26, 1875 |
| 169,171 | Hoch | Oct. 26, 1875 |
| 537,165 | Mandt | Apr. 9, 1895 |
| 540,995 | Levy | June 11, 1895 |
| 749,187 | Hanlon | Jan. 12, 1904 |
| 1,526,934 | Robbins | Feb. 17, 1925 |
| 1,619,504 | Gabriel | Mar. 1, 1927 |
| 2,179,300 | Phelps | Nov. 7, 1939 |